July 31, 1934. H. A. KNOX ET AL 1,968,043
VEHICLE
Filed Sept. 24, 1930  2 Sheets-Sheet 2
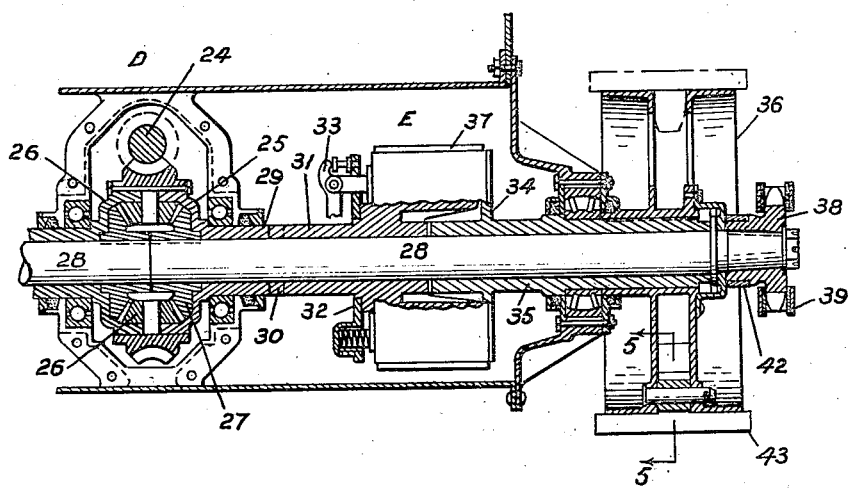
Fig-2-
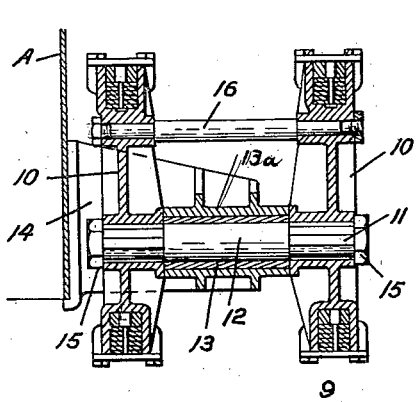
Fig-3-
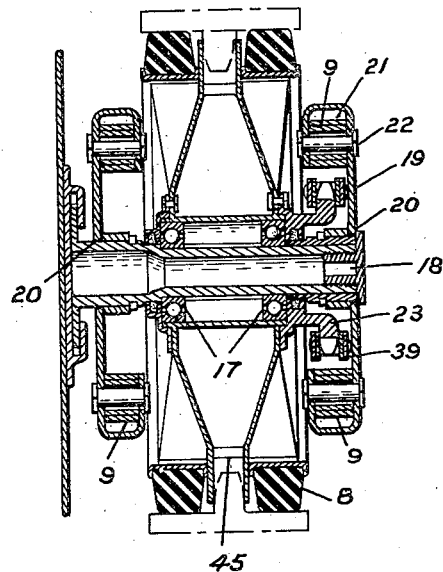
Fig-4-
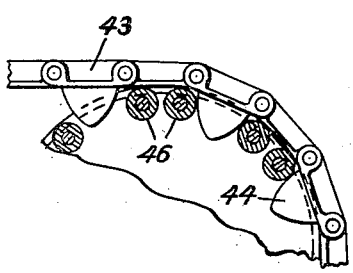
Fig-5-
INVENTORS
Harry A. Knox
BY Charles Hiller, Jr.
W. N. Roach
ATTORNEY

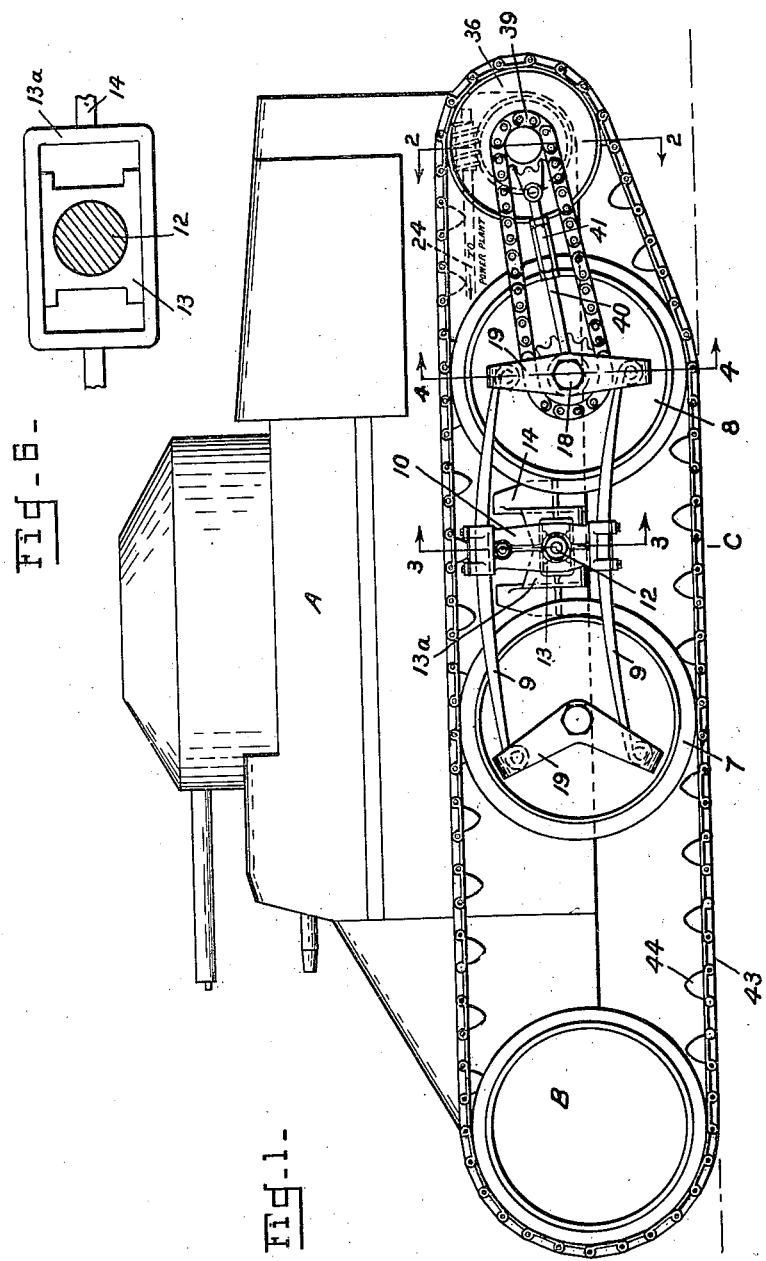

Patented July 31, 1934

UNITED STATES PATENT OFFICE 1,968,043

VEHICLE

Harry A. Knox, Davenport, Iowa, and Charles Hiller, Jr., St. Louis, Mo.

Application September 24, 1930, Serial No. 484,134

9 Claims. (Cl. 180—9.2)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a vehicle.

Vehicles of the track-laying type are essentially designed and employed for cross-country traveling. Certain types of these vehicles, generally referred to as combination wheel and track vehicles, are arranged so that when the track is removed the track wheels serve as road wheels to permit travel on paved roads at a greater speed.

The present invention is directed particularly to the suspension and power communication, these elements being intimately associated in a novel relation that is characterized by spring suspended wheel units having longitudinal movement, one of the wheels being driven by sprocket and chain from a shaft that is coaxial with the drive to the track-driving wheel. The purpose of this arrangement is to provide an efficient and simple power communication through a single differential gear unit.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of a vehicle embodying the principles of the invention;

Figs. 2 to 4 are detail sectional views on the corresponding lines of Fig. 1;

Fig. 5 is a detail sectional view on the line 5—5 of Fig. 2; and

Fig. 6 is a detail sectional view through the sliding shoe of Fig. 3.

Referring to the drawings by characters of reference:

There is shown a vehicle comprising a body or load member A and load supporting wheels, the front wheels B being conventionally mounted for steering as in an automobile, and the group C of rear wheels being specifically mounted as hereinafter described.

The group C of rear wheels preferably consists of a pair of wheels 7 and 8 placed one in front of the other and carried at the extremities of a frame which is essentially composed of four parallel sets of semielliptic leaf springs 9, the inside and outside sets each centrally supported in vertically spaced relation in a yoke 10 (Fig. 3). The pair of yokes 10—10 are fixed by splines 11 on the extremities of a supporting shaft 12 which is journaled in a shoe 13. The shoe 13 forms part of a cross head carried by the bracket 14, in the portion 13a of which cross head the shoe 13 has a sliding fit. This movement of the shoe 13 is rendered necessary by reason of the fact that when the springs are flexed in a direction to flatten out the distance between the shaft 18 and the shaft 12 is lengthened. A screw bolt 15 in each end of the shaft holds the yoke against the bracket while a tie rod 16 spaces the upper portions of the yokes.

The mounting of the wheels 7 and 8 are substantially identical and only one will be described. Referring to Fig. 4, the rearmost wheel 8 of the group C is mounted through roller bearings 17 on an axle 18. The connection between the wheel 8 and the springs 9 is established by means of a pair of link members 19 fixed intermediate their ends as by welding 20 to the axle and positioned on each side of the wheel. The extremities of the upper and lower arms of the link member are turned over towards the wheel to form a pocket 21 for receiving the end of a leaf spring 9 which is anchored by a pin 22 extending through the arm. The rear wheel 8 carries a sprocket 23 but the wheel 7 does not include this element. The mounting of the wheel 7 differs from that of the wheel 8 in that its link members 19 are angled to permit the leaf springs to extend beyond the axle of the wheel.

Referring to Fig. 2 in which the features of the power communication are illustrated without duplication, there is shown a standard type of differential gearing D including the power shaft 24, ring gear 25, pinions 26, and bevel gears 27, the gears 27 splined on a divided shaft 28. The ring gear is formed at each side with an integral sleeve 29 journaled on the axle. For the purpose of assembly the sleeve 29 is coupled as at 30 to a continuing sleeve 31 also journaled on the axle and carrying one element 32 of a standard type disk clutch E including the operating unit 33. The other element 34 of the clutch is likewise on a sleeve 35 which is journaled on shaft 28 and which extends outside the body A and terminally carries by means of splines a large track-driving sprocket wheel 36. The element 34 of the clutch constitutes a brake drum engageable by the brake band 37.

The divided shafts 28 each terminally carry by means of splines a small sprocket wheel 38. A chain 39 (Fig. 1) is trained over the sprocket 38 and the sprocket 23 on the wheel 8. A radius rod 40 having a turn buckle 41 is secured to a ring 42 (Fig. 2) loose on the sprocket wheel 38 and to the outside link member 19 of the wheel 8.

The track 43 which is of the link type extends around some or all of the road wheels and the sprocket 36. It is provided with spaced driving lugs 44 fitting in a guide channel 45 in the road wheels B, 7 and 8 and between sets of paired rollers 46 on the sprocket wheel 36.

When the vehicle is employed as a track-laying unit, as seen in Fig. 1, the front wheels B are locked against steering and the sprocket chains 39 are removed. The drive is taken from the power shaft 24 through the ring gear 25, sleeves 29 and 31, clutch E, sleeve 35 and sprocket wheel 36. Steering is accomplished by disconnecting one of the clutches E to cut out the drive to the corresponding sprocket wheel 36 or with the clutch E engaged and effective, the brake band 37 may be applied to cause slippage of the clutch and thereby decrease the speed of rotation of the corresponding sprocket wheel. This manner of steering by driving one track while holding the other is typical of track laying vehicles.

In adapting the vehicle for traveling at high speeds on roads the track 43 is removed. Under these conditions the drive is communicated through the differential to the shafts 28—28 and by the chains 39 to the rear road wheels 8. When the vehicle is used without the tracks 43 it is steered by manipulating the front wheels B.

The suspension constituted by the road wheels 7 and 8 and the leaf springs 9 functions with equal efficiency under both conditions of traction. The group C of rear wheels is free to rock about the supporting shaft 12 in conforming to irregularities of the ground as well as being capable of slight longitudinal displacement under restraint of the radius rod 40.

We claim:

1. In a vehicle, a load member, a leaf-spring suspension unit mounted for pivotal and longitudinal sliding movement on each side of the load member, a road wheel carried at each end of the suspension unit, a sprocket fast on the rearmost road wheel, a power drive for the vehicle including differential gearing, a pair of coaxial shafts driven through the differential, a sprocket on the end of each shaft to receive a chain trained over each one of said sprockets and the sprocket of the rearmost wheel on the corresponding side of the load member, a sleeve on each of the coaxial shafts and driven with the ring gear of the differential, a clutch interposed in each of said sleeves, a sprocket wheel on the end of each sleeve, an endless track trained over each of said sprocket wheels and the road wheels on the corresponding side of the load member, and a radius rod attached to each suspension unit and centered on the coaxial shafts.

2. In a vehicle, a load member, leaf-spring suspension unit mounted for pivotal movement on each side of the load member, a road wheel carried at each end of the suspension unit, a sprocket fast on the rearmost road wheel, a power drive for the vehicle including differential gearing, a pair of coaxial shafts driven through the differential, a sprocket on the end of each shaft to receive a chain trained over each one of said sprockets and the sprocket of the rearmost wheel on the corresponding side of the load member, a sleeve on each of the coaxial shafts and driven with the ring gear of the differential, a clutch interposed in each of said sleeves, a sprocket wheel on the end of each sleeve, and an endless track trained over each of said sprocket wheels and the road wheels on the corresponding side of the load member.

3. In a vehicle, a load member, a road wheel on each side of the load member, a spring suspension between each wheel and the load member, a sprocket fast on each wheel, a power drive for the vehicle including differential gearing, a pair of coaxial shafts driven through the differential, a sprocket on the end of each shaft, a chain trained over each one of said sprockets and the sprocket of the road wheel on the corresponding side of the load member, a sleeve on each of the coaxial shafts and driven with the ring gear of the differential, a clutch interposed in each of said sleeves, and a track-driving sprocket wheel on the end of each sleeve.

4. In a vehicle, a load member, a road wheel on each side of the load member, a spring suspension between each wheel and the load member, a sprocket fast on each wheel, a pair of differentially driven collinear shafts carried by the load member, a sprocket on the end of each shaft, a chain trained over each one of said sprockets and the sprocket of the road wheel on the corresponding side of the load member, a driven sleeve on each of the collinear shafts, a clutch interposed in each of said sleeves, and a track driving sprocket wheel on the end of each sleeve.

5. In a vehicle having road wheels, differential gearing including a ring gear, a pair of shafts driven through the differential gearing, a chain drive between each of said shafts and a road wheel on the corresponding side of the vehicle, a member coaxial with said shafts and driven with the ring gear of the differential, a clutch in said member on each side of the differential and a track-driving sprocket on each end of said member.

6. In a vehicle having road wheels, differentially driven shafts, a chain drive between each of said shafts and a road wheel on the corresponding side of the vehicle, a selectively driven member coaxial with each of said shafts and a track-driving sprocket on each of said members.

7. In a vehicle, a differential gearing including a ring gear, divided shafts driven through the differential gearing, a sprocket on the end of each shaft, a second sprocket coaxial with said preceding sprocket, and means driven with the ring gear of the differential gearing and including a selective transmission, for driving said second sprocket.

8. In a vehicle, a bracket on each side of the body, a shoe slidable in each bracket, a yoke trunnioned in each shoe, two horizontally spaced sets of vertically spaced leaf springs carried by the yoke, a link connecting the ends of the vertically spaced springs, an axle carried by opposite links, a wheel on each axle, a divided power shaft, a chain drive between each of the power shafts and one of the road wheels on the corresponding side of the vehicle and a radius rod between the power shaft and said wheel.

9. In a vehicle, a load member, a leaf spring suspension unit mounted for pivotal and longitudinal sliding movement on each side of the load member, a road wheel carried at each end of the suspension unit, a divided power shaft, a chain drive between each of the power shafts and one of the road wheels on the corresponding side of the vehicle, and a radius rod between the power shaft and said wheel.

HARRY A. KNOX.
CHARLES HILLER, Jr.